US010330258B2

(12) United States Patent
Ramaswamy et al.

(10) Patent No.: US 10,330,258 B2
(45) Date of Patent: Jun. 25, 2019

(54) POWER TOOL WITH ULTRASONIC SENSOR FOR SENSING CONTACT BETWEEN AN IMPLEMENT AND AN OBJECT

(71) Applicant: Robert Bosch GmbH, Stuttgart (DE)

(72) Inventors: Bharadwaja Maharshi Ramaswamy, Bangalore (IN); Vishwanatha Manevarthe Srikantiah, Bangalore (IN); Niranjan Sathyanarayanarao Krishnarao, Bangalore (IN)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 399 days.

(21) Appl. No.: 15/104,184

(22) PCT Filed: Dec. 12, 2014

(86) PCT No.: PCT/EP2014/077525
§ 371 (c)(1),
(2) Date: Jun. 13, 2016

(87) PCT Pub. No.: WO2015/096999
PCT Pub. Date: Jul. 2, 2015

(65) Prior Publication Data
US 2016/0319989 A1 Nov. 3, 2016

(30) Foreign Application Priority Data
Dec. 24, 2013 (IN) ............ 6071/CHE/2013

(51) Int. Cl.
F16P 3/14 (2006.01)
B23D 59/00 (2006.01)
B27G 19/02 (2006.01)

(52) U.S. Cl.
CPC ............ *F16P 3/141* (2013.01); *B23D 59/002* (2013.01); *B27G 19/02* (2013.01)

(58) Field of Classification Search
CPC ..... F16P 3/00; F16P 3/14; F16P 3/141; B23D 59/00; B23D 59/002; B23D 59/003
See application file for complete search history.

(56) References Cited

U.S. PATENT DOCUMENTS 4,907,432 A * 3/1990 Maillefer ................ F16P 3/144
72/1
5,047,752 A * 9/1991 Schorn .................... F16P 3/141
192/129 A (Continued)

FOREIGN PATENT DOCUMENTS

CN     1547521 A     11/2004

OTHER PUBLICATIONS

International Search Report corresponding to PCT Application No. PCT/EP2014/077525 dated Apr. 10, 2015 (4 pages).

*Primary Examiner* — Jason Daniel Prone
*Assistant Examiner* — Richard D Crosby, Jr.
(74) *Attorney, Agent, or Firm* — Maginot Moore & Beck LLP

(57) ABSTRACT

A power tool (200) includes a moving implement (222) and an ultrasonic transducer (226) that emits ultrasonic signals and receives echo return signals from an object (224, 229) that reflects the ultrasonic signals. A controller (240) identifies a distance between the implement and the object and identifies a type of the object based on the echo return signals from the object. The controller activates an implement arrest mechanism (236) in response to the distance between the object and the ultrasonic transducer being less than a predetermined threshold and the type of the object corresponding to a portion of a human body.

12 Claims, 4 Drawing Sheets

(56) References Cited

U.S. PATENT DOCUMENTS

| | | | | |
|---|---|---|---|---|
| 6,462,811 B1* | 10/2002 | Turner | G01B 11/00 348/125 |
| 7,049,967 B2* | 5/2006 | Grasselli | F16P 3/12 192/130 |
| 7,084,779 B2* | 8/2006 | Uneyama | B23D 59/001 340/573.1 |
| 7,311,276 B2* | 12/2007 | Matlin | B02C 18/0007 241/236 |
| 7,924,164 B1* | 4/2011 | Staerzl | F16P 3/142 192/129 R |
| 8,311,661 B2* | 11/2012 | Krapf | B23D 59/001 700/174 |
| 8,386,067 B2* | 2/2013 | Krapf | B23Q 11/0082 700/174 |
| 8,925,433 B2* | 1/2015 | Stellmann | B23Q 11/0082 83/477.1 |
| 8,948,903 B2* | 2/2015 | Niehsen | F16P 3/14 700/177 |
| 8,950,305 B1* | 2/2015 | Shiban | B27B 5/38 83/58 |
| 2002/0163577 A1* | 11/2002 | Myers | G08B 13/19643 348/152 |
| 2004/0200329 A1* | 10/2004 | Sako | B23D 59/001 83/58 |
| 2006/0096425 A1* | 5/2006 | Keller | B23D 59/001 83/13 |
| 2006/0101960 A1* | 5/2006 | Smith | B23D 59/001 83/58 |
| 2008/0021597 A1 | 1/2008 | Merte et al. | |
| 2008/0173147 A1* | 7/2008 | Kovarik | B23D 59/001 83/62 |
| 2008/0240577 A1* | 10/2008 | Aartsen | H04N 7/181 382/218 |
| 2010/0152882 A1* | 6/2010 | Krapf | B23D 59/001 700/177 |
| 2010/0300256 A1* | 12/2010 | Loewe | B23Q 11/0082 83/72 |
| 2014/0090948 A1* | 4/2014 | Krishnarao | B27G 19/02 192/130 |
| 2016/0263675 A1* | 9/2016 | Volpert | B23D 59/001 |
| 2016/0263762 A1* | 9/2016 | Ramaswamy | B26D 5/005 |
| 2016/0318142 A1* | 11/2016 | Maharshi Ramaswamy | F16P 3/142 |
| 2016/0319989 A1* | 11/2016 | Ramaswamy | F16P 3/141 |

* cited by examiner

POWER TOOL WITH ULTRASONIC SENSOR FOR SENSING CONTACT BETWEEN AN IMPLEMENT AND AN OBJECT

CLAIM OF PRIORITY

This application is a 35 U.S.C. § 371 National Stage Application of PCT/EP2014/077525, filed on Dec. 12, 2014, which claims the benefit of priority to Indian Provisional Application No. 6071/CHE/2013, which is entitled "Power Tool With Ultrasonic Sensor For Sensing Contact Between An Implement And An Object," and was filed on Dec. 24, 2013, the entire contents of which are hereby incorporated by reference herein.

TECHNICAL FIELD

This disclosure relates generally to power tools, and, more specifically, to systems and methods for detecting contact between a human and a moving implement in a power tool.

BACKGROUND

Detection or sensing systems have been developed for use with various kinds of manufacturing equipment and power tools. Such detection systems are operable to trigger a reaction device by detecting or sensing the proximity or contact of some appendage of an operator with some part of the equipment. For example, existing capacitive contact sensing systems in table saws detect contact between the operator and the blade.

FIG. 1 depicts a prior art capacitive sensing based detection system 90 that is incorporated with a table saw 100. The detection system 90 generates an excitation voltage that is electrically coupled to a movable blade 22 of the saw 100 and detects the current drawn by the blade 22. The amplitude or phase of the detected current and/or excitation voltage changes when the blade 22 comes into contact with an electrically conductive object (such as an operator's hand, finger or other body part, as well as work pieces). The characteristics of the changes are used to trigger the operation of a reaction system 92. The reaction system 92 disables operation of the blade 22 by, for example, applying a brake to cease motion of the blade 22 and/or by dropping or otherwise removing the blade 22 from the cutting area. One example reaction system 92 uses an explosive charge to drive a stopper (not shown) into the blade 22 to arrest the motion of the blade 22. In addition, or instead, an example reaction system 92 drops or collapses a blade support member (not show) to urge the blade 22 below the surface of the table 14.

The embodiment of the detection system 90 shown in FIG. 1 includes an oscillator 10 that generates a time-varying signal on line 12. The time-varying signal is any suitable signal type including, for example, a sine wave, a sum of multiple sine waves, a chirp waveform, a noise signal, etc. The frequency of the signal is chosen to enable distinction between contact with the first object, such as a finger or hand, and a second object, such as wood or other material to be cut by the power tool. In the embodiment of FIG. 1, the frequency is 1.22 MHz, but other frequencies can also be used, as well as non-sinusoidal wave shapes. The oscillator 10 is electrically connected to the earth ground for the AC power source that provides the energy to operate the saw table 14 to enable the detection system and the table saw to be commonly ground to earth ground. As shown in FIG. 1, the blade 22 is disposed vertically in an opening defined by the saw table 14 (or work surface or cutting surface or platform).

The oscillator 10 is connected to two voltage amplifiers or buffers 16, 18 through the line 12. The first voltage amplifier 16 has an output connected to line 20, which operatively couples the output of the oscillator to the saw blade 22. A current sensor 24 operatively couples a signal from line 20 onto line 26 that is fed to an amplifier 28, the output of which is connected to a processor 30 by line 32. The current sensor 24 is, for example, a current sense transformer, a current sense resistor, a Hall Effect current sense device, or other suitable type of current sensor. An output line 34 from the processor 30 is operatively connected to the reaction system 92 so that the processor 30 triggers the reaction system 92 if predetermined conditions are detected indicating, for example, contact between the blade 22 and the first object.

The signal on line 26 is indicative of the instantaneous current drawn by the blade 22. Because the saw blade 22 is in motion during operation of the table saw, the connection is made through an excitation plate 36, which is mounted generally parallel to the blade 22. The plate 36 is driven by the first voltage amplifier 16. The plate 36 is held in a stable position relative to the side of the blade 22. The excitation plate 36 is configured to follow the blade 22 as the height and bevel angle of the blade 22 are adjusted during operation of the saw 100.

The capacitance between the first object and the saw table 14 (or power line ground if one is present) is in the range of approximately 30-50 pF in the embodiment of FIG. 1. When the capacitance between the excitation plate 36 and the saw blade 22 exceeds the capacitance between the first object and the saw table 14, the detection thresholds are not unduly affected by changes in the plate-to-blade capacitance. In the configuration of FIG. 1, the plate 36 is arranged in parallel with the blade 22 on the side where the blade 22 rests against the arbor 37, so that changes in blade thickness do not affect the clearance between the blade 22 and the plate 36. Other methods of excitation, including contact through the arbor bearings or brush contact with the shaft or the blade, could be used to the same effect.

In the detection system 90, the second-amplifier 18 is connected to a shield 38, and the amplifier 18 drives the shield 38 to the same potential as the excitation plate 36. Also, sensors in the detection system 90 optionally monitor the level of electrical current drawn by the shield 38. The shield 38 extends around the blade 22 underneath the table 14, and is spaced some distance away from the blade 22 on the top of the table 14 in the configuration of FIG. 1. The configuration of the shield 38 reduces the static capacitance between the blade 22 and the table 14, which acts as a ground plane if the table is not electrically connected to an earth ground. In various embodiments, the shield 38 is a continuous pocket of mesh, or some other type of guard, which is electrically equivalent to a Faraday cage at the excitation frequencies generated by the oscillator 10. The shield 38 optionally includes a component that moves with the blade adjustments, or is large enough to accommodate the blade's adjustment as well as the various blades that fit the table saw. In the configuration of FIG. 1, the shield 38 moves with the blade adjustments, and includes a throat plate area of the table top 14.

The processor 30 performs various pre-processing steps and implements an adaptive trigger to detect conditions indicative of contact between the first object and the blade 22. The processor 30 optionally includes one or more associated analog-to-digital (A/D) converters. The blade current signal from the current sensor 24 is directed to one or more of the A/D converters, which generate a corresponding digital signal. A blade voltage signal representing the voltage drop between the blade 22 and the excitation plate 36 is directed to an A/D converter to generate a digital blade voltage signal in some embodiments. The processor 30 receives the digitized signal and performs various digital signal processing operations and/or computes derivative parameters based on the received signal. The processor 30 analyzes or otherwise performs operations on the conditioned blade signal to detect conditions indicative of contact between the first object and the blade 22.

As noted above, existing detection systems, such as the system 90 of FIG. 1, require a connection to earth ground to detect contact between a human and the implement of the power tool, such as the blade 22. During operation of the saw, the moving blade generates electrical noise and static electric discharges that can reduce the accuracy of the detection system. Furthermore, some work pieces, such as wood that has a high water contact, may generate an electrical signal that is indistinguishable from contact with a human operator. Additionally, the prior art detection system requires actual contact between a human operator and the blade 22 before the system activates a brake or blade drop mechanism. Given these drawbacks, improvements to detection systems that identify contact or potential contact between a human operator and a moving implement in a power tool would be beneficial.

SUMMARY

In one embodiment, a power tool with a moving implement and a system for detecting objects in proximity to the moving implement has been developed. The power tool includes an implement located in a predetermined location in the power tool, an actuator configured to move the implement in a predetermined motion during operation of the power tool, an implement arrest mechanism operatively connected to the implement, an ultrasonic emitter and an ultrasonic receiver, the ultrasonic emitter being configured to emit an ultrasonic signal and the ultrasonic receiver being configured to receive an echo return signal from an object that reflects the ultrasonic signal, and a controller operatively connected to the actuator, the ultrasonic emitter, the ultrasonic receiver, and the implement arrest mechanism. The controller is configured to operate the actuator to move the implement, identify a distance between the implement and an object that is proximate to the implement with reference to data corresponding to an ultrasonic signal emitted from the ultrasonic emitter and an echo return signal received by the ultrasonic receiver, identify a type of the object with reference to an amplitude of the echo return signal, and activate the implement arrest mechanism to stop movement of the implement or move the implement from the predetermined location to prevent contact between the object and the implement while the implement is in motion in response to the identified distance being less than a predetermined threshold and the identified type of the object corresponding to a portion of a human body.

In another embodiment, a method of operating a power tool has been developed. The method includes operating an actuator to move an implement. operating with a controller an ultrasonic emitter to emit an ultrasonic signal, receiving with an ultrasonic receiver an echo return signal from an object corresponding to the ultrasonic signal emitted from the ultrasonic emitter, identifying with the controller a distance between the implement and an object that is proximate to the implement with reference to the emitted ultrasonic signals and the received echo return signals, identifying with the controller a type of the object with reference to an amplitude of the echo return signal, and activating with the controller an implement arrest mechanism to stop movement of the implement or move the implement from the predetermined location to prevent contact between the object and the implement while the implement is in motion in response to the identified distance between the object and the transducer being less than a predetermined threshold and the identified type of the object corresponding to a portion of a human body.

DETAILED DESCRIPTION

For the purposes of promoting an understanding of the principles of the embodiments described herein, reference is now made to the drawings and descriptions in the following written specification. No limitation to the scope of the subject matter is intended by these references. This patent also encompasses any alterations and modifications to the illustrated embodiments as well as further applications of the principles of the described embodiments as would normally occur to one skilled in the art to which this document pertains.

As used herein, the term "power tool" refers to any tool with one or more moving parts that are moved by an actuator, such as an electric motor, an internal combustion engine, a hydraulic or pneumatic cylinder, and the like. For example, power tools include, but are not limited to, bevel saws, miter saws, table saws, circular saws, reciprocating saws, jig saws, band saws, cold saws, cutters, impact drives, angler grinders, drills, jointers, nail drivers, sanders, trimmers, and routers. As used herein, the term "implement" refers to a moving part of the power tool that is at least partially exposed during operation of the power tool. Examples of implements in power tools include, but are not limited to, rotating and reciprocating saw blades, drill bits, routing bits, grinding disks, grinding wheels, and the like. As described below, a sensing circuit integrated with a power tool is used to avoid contact between a human operator and the implement while the implement is moving.

As used herein, the term "implement arrest mechanism" refers to a range of devices including brakes and retraction mechanisms that stop a moving implement or retract the moving implement from a location where the implement can contact a human operator. For example, a blade brake mechanism in a saw stops the motion of a moving blade in a short period of time. A blade drop or blade retraction device moves the blade out of a position where the blade can contact a human operator. In a table saw embodiment, a blade drop system pulls a moving blade below the level of the table in the table saw to prevent continuing contact between the blade and the operator.

Figure 1:
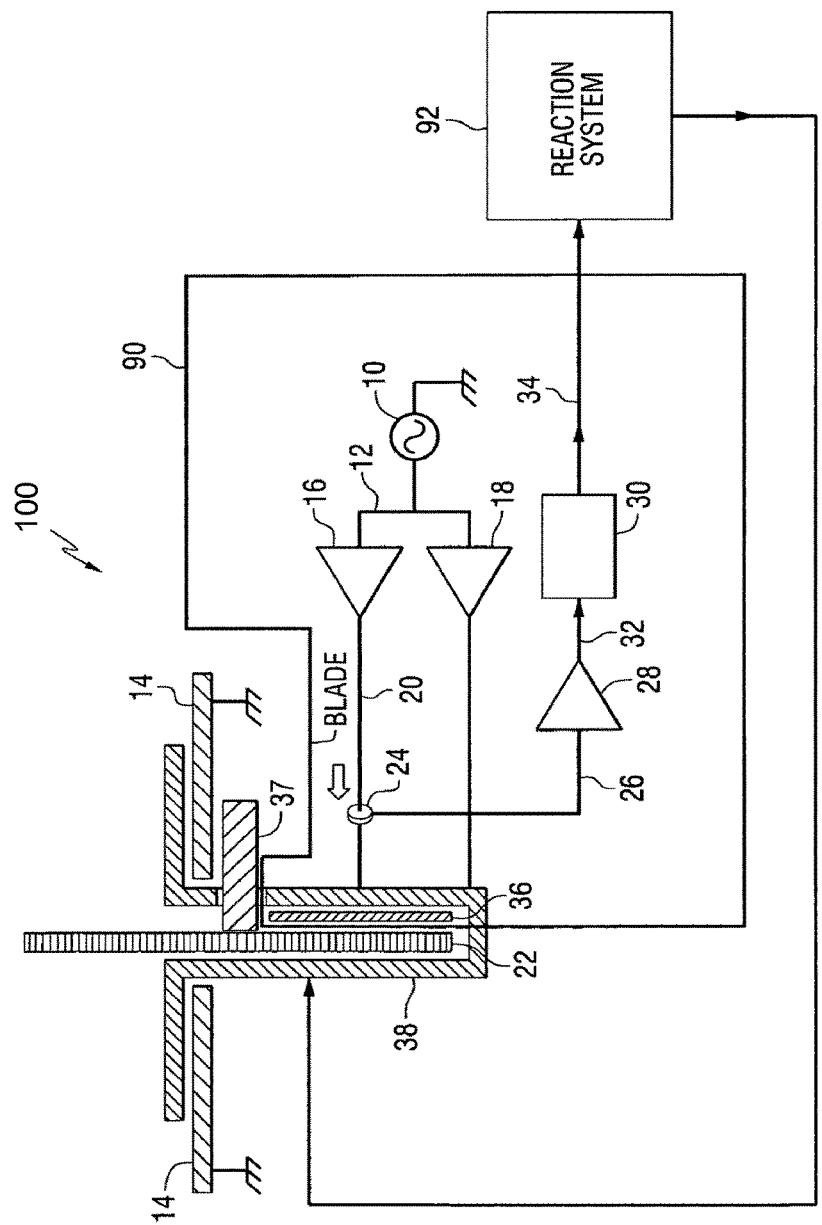
FIG. 1 is a schematic diagram of a prior art table saw including a prior art detection system for detecting contact between a human and a saw blade.
Figure 2:
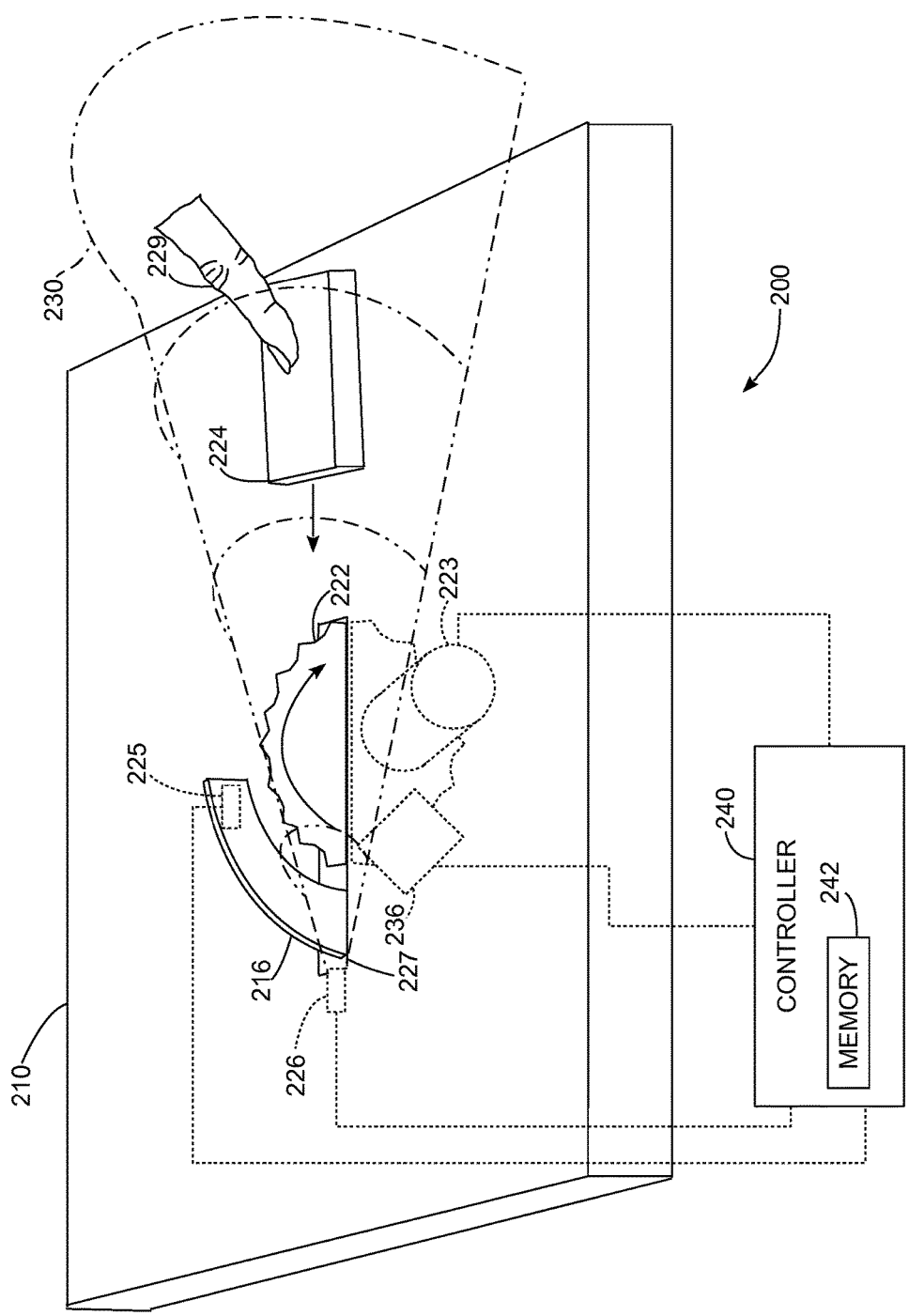
FIG. 2 is a schematic diagram of a table saw including an ultrasonic sensor that identifies the location and types of objects that are proximate to a moving blade in the table saw.
Figure 2A:
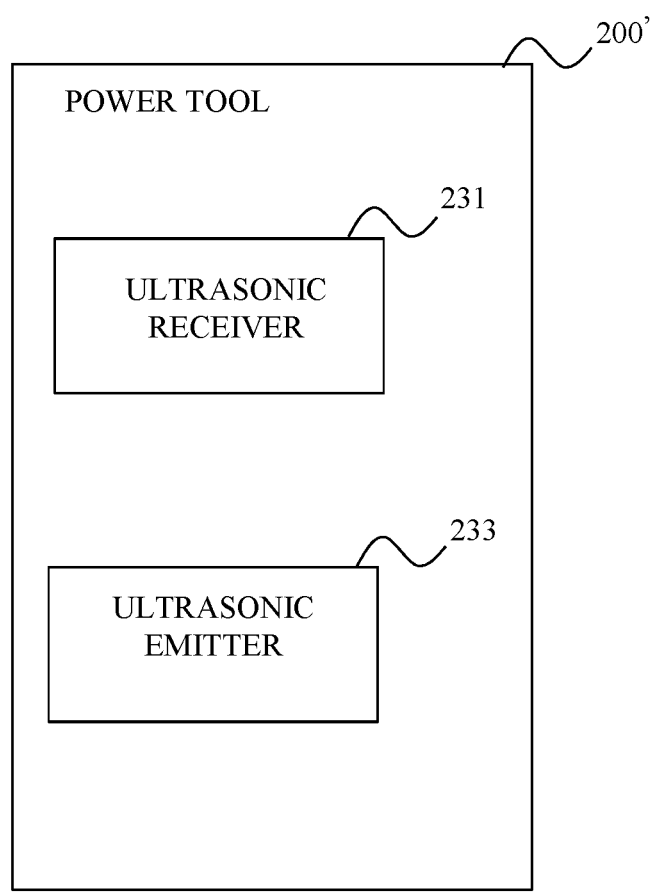
FIG. 2A is a schematic diagram of a power tool 200' which includes an ultrasonic receiver 231 and an ultrasonic emitter 233.

FIG. 2 depicts a table saw 200. The saw 200 includes a table 210, a rotating saw blade 222, and an ultrasonic transducer 226 that is positioned in the table 210 to emit ultrasonic waves towards the blade 222 and a region around the blade 222 that includes a work piece, such as the work piece 224. The transducer 226 operates as both an ultrasonic emitter that emits ultrasonic signals and an ultrasonic receiver that receives echo return signals from the surfaces of one or more objects, such as the work piece 224 and finger 229 in FIG. 2. In an alternative configuration, a power tool uses separate ultrasonic emitter and receiver devices. By way of example, FIG. 2A depicts a power tool 200' which includes an ultrasonic receiver 231 and an ultrasonic emitter 233. FIG. 2 also depicts an alternative configuration of an ultrasonic transducer 225 that is positioned on a riving knife 216 in the saw 200. More generally, power tools incorporate one or more ultrasonic emitters and receivers that are located in predetermined locations with reference to the implement in the power tool to generate ultrasonic signals that reflect from objects in a region around the implement.

In the saw 200, an electrical motor 223 or other actuator is operatively connected to the saw blade 222 to rotate the saw blade 222 during operation of the saw 200. The blade 222 extends through an opening 227 that is formed in the surface of the table 210. In the configuration of FIG. 2, the ultrasonic transducer 226 is located under the table 210 and behind the blade 222 to enable the ultrasonic transducer to emit ultrasonic signals into a region 230 around the saw blade 222. FIG. 2. also depicts an alternative configuration of an ultrasonic transducer 225 that is mounted on a riving knife 216 in the saw 200. The riving knife 216 is mounted above a portion of the blade 222. In either configuration, the ultrasonic transducer emits ultrasonic energy in a region 230 around the saw blade 222. The ultrasonic transducers 225 or 226 also receive echo return signals from some of the ultrasonic waves that reflect from the surfaces of objects including the blade 222, work piece 224, and potentially a hand or other part of the body of a human operator. The ultrasonic transducers 225 or 226 are positioned under the table 210 to avoid contact with the blade 222 and with work pieces such as the work piece 224. In FIG. 2, a controller 240 controls the operation of the ultrasonic transducers 225 or 226 and an implement arrest mechanism 236 that withdraws the blade 222 below the level of the table 210 in the saw 200. In alternative embodiments the implement arrest mechanism 236 is a blade brake that stops the rotation of the blade 222 in a rapid manner, or that both stops the rotation of the blade 222 and withdraws the blade 222 below the level of the table 210. The controller 240 is, for example, a microcontroller, microprocessor, digital signal processor (DSP), or other suitable digital logic device that receives data corresponding to return signals from the ultrasonic transducers 225 or 226 to identify the presence and location of objects that are proximate to the blade 222.

During operation of the saw 200, the blade 222 rotates to cut the work piece 224. In the illustrative example of FIG. 2, the work piece 224 is a block of wood. A human operator pushes the work piece 224 past the blade 222. The ultrasonic transducer 225 or 226 emits the ultrasonic in the region 230 around the blade 222 and the work piece 224. Some of the ultrasonic signals reflect from the surface of the work piece 224. The controller 240 and ultrasonic transducers 225 or 226 use signal gating or other techniques that are known to the art to control the emission of the ultrasonic signals to enable the controller 240 to identify a time delay between the emission of an ultrasonic signal and the return of an echo corresponding to the emitted signal from an object. The controller 240 uses the time delay and a predetermined propagation velocity of the ultrasonic signal to identify a distance between the ultrasonic transducers 225 or 226 and the object. Since the saw 200 holds the saw blade 222 in a fixed position relative to the ultrasonic transducers 225 or 226, the controller 240 also identifies a distance between the object and the blade 222.

During operation of the saw 200, the controller 240 and the ultrasonic transducers 225 or 226 detect different objects that move into proximity with the saw blade 222. During normal operation, work pieces, such as the work piece 224, move into contact with the rotating blade 222 as the saw 200 cuts the work pieces. If, however, a hand or other body part of a human operator comes within a predetermined distance of the blade 222, some of the ultrasonic signals also reflect from the hand of the human operator. The controller 240 is configured to distinguish between a work piece that is made out of wood or another appropriate material and the skin, gloves, or clothing of a human operator.

The controller 240 identifies types of objects that reflect the ultrasonic signals based on the amplitude levels of the echo return signals. For example, the controller 240 distinguishes between work pieces and the human operator based on the amplitude levels of the echo return signals from the ultrasonic transducers 225 or 226. For example, a wood work piece has a higher level of reflectivity to the ultrasonic signals compared to the skin or clothing of a human operator, which absorbs a larger proportion of the energy in the ultrasonic signal. The saw 200 operates with the spinning blade 222 while the controller 240 detects objects with high reflectivity levels such as the wood work piece 224. The controller 240 identifies if the amplitude of an echo return signal at a predetermined range from the ultrasonic transducers 225 or 226 corresponds to the work piece or if the object is a human body part or clothing. If the controller 240 identifies that an object is a human body part or clothing associated with a human and that the object is within a predetermined distance of the blade 222, then the controller 240 activates an implement arrest mechanism to prevent contact between the object and the moving saw blade 222. In the saw 200, the controller 240 activates the implement arrest mechanism before a human operator comes into contact with the saw blade 222.

During operation, the controller 240 activates the ultrasonic transducers 225 or 226 to emit ultrasonic waves in a region of the table 210 around the saw blade 222. The ultrasonic transducers 225 or 226 emit the ultrasonic waves in a frequency range of 20 KHz-1 MHz. When objects, such as a work piece or a portion of the body of a human operator move on the table 210, a portion of the ultrasonic waves are reflected from the objects and are detected by the ultrasonic transducers 225 or 226.

The controller 240 receives signals from the ultrasonic transducers 225 or 226 corresponding to reflections from the objects on the table 210 as the objects approach the saw blade 222. During operation, the saw blade 222 should remain in motion to cut work pieces such as the work piece, but if the controller 240 identifies skin in a portion of the body of a human operator that moves within a predetermined minimum distance of the blade 222, then the controller 240 activates a blade brake or a blade retraction mechanism. To distinguish between a work piece and human skin, the controller 240 identifies the level of amplitude of the incident wave that is reflected from the object and the portion of the wave that is absorbed by the object. The absorption coefficient α corresponds to the absorption coefficient ratio:

$$\alpha = \frac{I_a}{I_i}.$$

The term $I_a$ corresponds to the portion of the ultrasonic wave $I_a$ that is absorbed by the object, and the term $I_i$ corresponds to the amplitude of the incident sound wave that is reflected from the object and received by the ultrasonic transducers 225 or 226. The amplitude values $I_a$ and $I_i$ are expressed in terms of watts/square meter (W/m²) or another suitable ratio of power to surface area. In an alternative configuration, the amplitude can be identified as a ratio of emitted power over reflected power using a normalized surface area of the object. In either configuration, the absorption coefficient α is a dimensionless number.

During operation, the controller 240 identifies the absorption coefficient α for objects that move on the table 210. A digital memory 242 associated with the controller 240 stores predetermined absorption coefficient data for a range of materials, including human skin and materials such as wood, brick, and plaster, which are commonly incorporated into work pieces. The controller 240 identifies the presence of human skin within a predetermined distance proximate to the blade 222 based on a difference between the absorption coefficient of skin compared to the work pieces. In general, work piece materials such as wood tend to reflect a larger portion of the ultrasonic waves from the transducers 225 or 226 in comparison to human skin, which absorbs a greater portion of the ultrasonic waves. The controller 240 deactivates the motor and engages a blade brake or a blade retraction mechanism if the absorption coefficient for an object that is proximate to the blade 222 corresponds to human skin. Table 1 lists examples of the absorption coefficients for human skin and various work pieces:

TABLE 1

Sound Absorption Coefficients for Different Materials

| Material | Sound Absorption Coefficient α |
|---|---|
| Plaster walls | 0.01-0.03 |
| Unpainted brickwork | 0.02-0.05 |
| Painted brickwork | 0.01-0.02 |
| 3 mm plywood panel | 0.01-0.02 |
| 6 mm cork sheet | 0.1-0.2 |
| 6 mm porous rubber sheet | 0.1-0.2 |
| 12 mm fiberboard on battens | 0.3-0.4 |
| 25 mm wood wool cement on battens | 0.6-0.07 |
| 50 mm slag wool or glass silk | 0.8-0.9 |
| 12 mm acoustic belt | 0.5-0.5 |
| Hardwood | 0.3 |
| 25 mm sprayed asbestos | 0.6-0.7 |
| 100 mm mineral wool | 0.65 |
| Human Skin | 2.0-5.0 |
| Acoustic tiles | 0.4-0.8 |

In the saw 200, the ultrasonic transducers 225 or 226 are not affected by electrical noise that is often generated due to static electric discharges between the blade 222 and the work piece 224 or other elements in the saw 200. The electrical noise degrades the accuracy of prior art blade contact detection systems. Additionally, existing blade contact detection systems often generate false positive results when wood with high water content contacts a saw blade, but the water content of the wood has minimal effect on the ultrasonic echo returns to the ultrasonic transducers 225 or 226 in the saw 200. Thus, the controller 240 and ultrasonic transducers 225 or 226 enable operation of the saw 200 to avoid contact between a human operator and the moving saw blade 222 with improved accuracy compared to existing blade contact detection systems.

Figure 3:
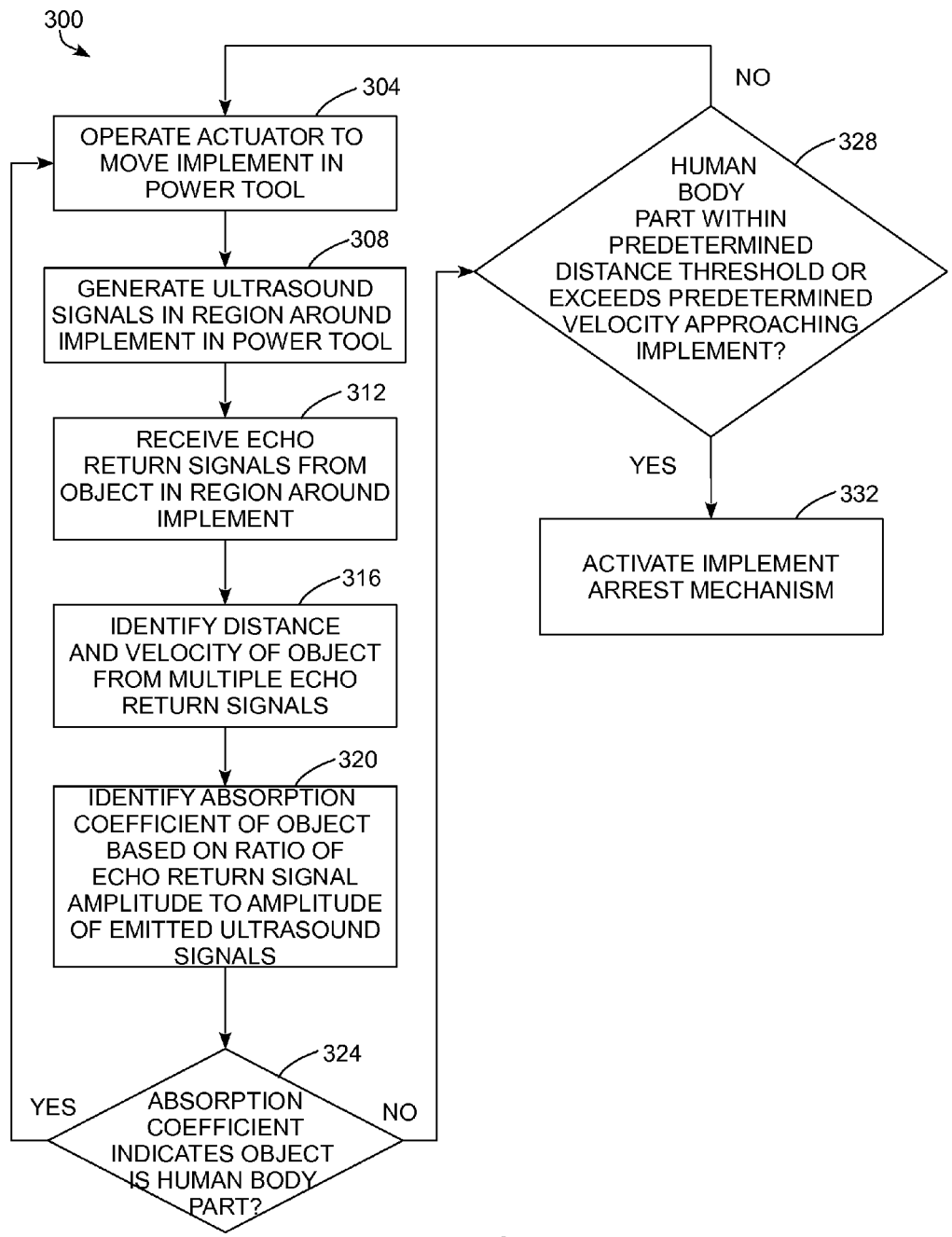
FIG. 3 is a block diagram of a process for operating a power tool using an ultrasonic sensor and implement arrest mechanism to prevent contact between a portion of a human body and a moving implement in the power tool.

FIG. 3 depicts a process 300 for operation of a power tool using an ultrasonic sensor and implement arrest mechanism to prevent contact between a portion of a human body and a moving implement in the power tool. In the discussion below, a reference to the process 300 performing a function or action refers to the execution of program instructions by a controller in the power tool to perform the function or action in conjunction with one or more components in the power tool. Process 300 is described in conjunction with the saw 200 of FIG. 2 for illustrative purposes.

Process 300 begins as the controller 240 operates the motor 223 to turn the saw blade 222 (block 304). In the saw 200, the motor 223 is an actuator and the rotating saw blade 222 is an implement that cuts one or more work pieces, such as the work piece 224.

During operation of the saw 200, the controller 240 operates the ultrasonic transducer 225 or 226 to emit ultrasound into the region around the blade 222 (block 308). As depicted in FIG. 2 the ultrasonic transducer 226 emits ultrasound into a region 230 around the blade 222 that includes the work piece 224 and potentially an object that corresponds to a portion of the human body, such as a finger 229. In another embodiment, the ultrasonic transducer 225 mounted on the riving knife 216 emits ultrasonic energy in a similar manner to a region in front of the saw blade 222.

Process 300 continues as the ultrasonic transducer receives echo return signals of the emitted ultrasonic signals that reflect from an object to identify a distance and velocity of one or more objects in the region 230 around the blade 222 (block 312). In the illustrative embodiment of FIG. 2, the transducer 226 emits the ultrasonic signal and includes a receiver that detects echo return signals including echo return signals from the work piece 224 and the finger 229. In other configurations, the power tool includes ultrasonic detectors that are located at one or more predetermined locations in the power tool relative to the location of the ultrasonic emitter. The ultrasonic detectors receive echo return signals when the emitted ultrasonic signals reflect from the surface of an object.

During process 300, the controller 240 processes the echo return signals to identify the distance and velocity of one or more objects in the region 230 (block 316). For example, the transducer 226 receives echo return signals from the work piece 224 and the finger 229 in the illustrative embodiment of FIG. 2. The controller 240 identifies the distances between the transducer 226 and the objects 224 and 229 with reference to a time period that elapses between emission of the ultrasonic signal and reception of the return signal, and a predetermined value of the speed of sound (e.g. approximately 340 m/sec or another value identified through a calibration process). For example, if the controller 240 identifies a 3 millisecond delay between the emission of an ultrasonic signal and reception of the echo return signal, then then controller 240 identifies the distance d between the transducer and the object as $$d = \frac{1}{2}(tv) = \frac{1}{2}(3 \times 10^{-3} \text{ s})\left(340\frac{\text{m}}{\text{s}}\right) \approx 0.5 \text{ m}$$

where t is time and v is the speed of sound. Note that the distance to the object d is identified as one-half of the total distance of travel for the ultrasonic emission because the ultrasonic emission travels to the object and the echo signal returns to the transducer. The controller 240 identifies the distance between the blade 222 and the object either expressly or implicitly with reference to the predetermined relative locations of the transducer 226 and the blade 222. Using the example above, if the leading edge of the blade 222 is 20 cm closer to the object than the transducer 226, then the distance between the blade 222 and the object is approximately 30 cm. The controller 240 identifies the velocity of the object based on multiple distance measurements from multiple echo return signals. The velocity is identified with reference to the change in distance over the predetermined time that elapses between generation of successive ultrasound emissions.

Process 300 continues as the controller 240 identifies a ratio of the amplitude of the emitted ultrasonic signal from the transducer to the amplitude of the echo return signal that is received from the object (block 220). In one embodiment, the amplitude ratio is normalized based on the distance between the ultrasound transducer and the object. As is known in the art, the amplitude of the ultrasound wave diminishes as the ultrasound wave moves away from the emitter according to the inverse square law. The amplitude of the reflected echo return signal also diminishes according to the inverse square law. Since the controller 240 has previously identified the distance to the object and since the ultrasonic transducer 225 or 226 emits the ultrasonic signal at a predetermined amplitude level (e.g. 1 watt), the controller 240 can identify attenuation of amplitude of the echo return signal that is caused by dispersion of the ultrasonic signal due to the inverse square law. In some embodiments, the controller 240 identifies an expected amplitude of an echo return signal from a perfectly reflective object and compares the expected amplitude of the return signal to the actual amplitude of the return signal. The controller 240 identifies the amplitude ratio $$\alpha = \frac{I_a}{I_i}$$

using normalized terms for $I_a$ and based $I_i$ based on the previously identified distance to the object and the inverse square law to identify the sound absorption coefficient value a of the material in the object.

The process 300 continues as the controller identifies if one or more of the detected objects has an amplitude absorption coefficient that corresponds to a human body part. In instances where the only objects present in the region 230 are work pieces, such as the work piece 224, then the absorption coefficient does not correspond to a portion of the human body and the process 300 continues in the same manner described above with reference to the processing of blocks 304-320.

If the controller 240 identifies that one or more objects in the region 230 have an absorption coefficient that corresponds to the human body, such as an absorption coefficient in a range of approximately 2.0 to 5.0 that is listed above in Table 1, then the controller 240 identifies that a human body part is present in the region 230 (block 324). Since the human body has a substantially higher absorption coefficient than the materials that are used in typical work pieces, in one embodiment the controller 240 identifies any object with an absorption coefficient above a predetermined threshold of 2.0 as being a portion of a human body. The controller 240 then identifies if the human body part is both outside of a predetermined distance from the moving implement and has a velocity in the direction of the implement that is less than a predetermined threshold to continue with operation of the saw as described above in the processing of blocks 304-324 (block 328).

If the controller 240 identifies that the human body part is within a predetermined distance of the implement or the velocity of the human body part in the direction of the moving implement exceeds a predetermined threshold (block 328), then the controller 240 activates the implement arrest mechanism 236 (block 332). For example, in one configuration, the controller 240 activates the blade drop mechanism 236 if either the finger 229 moves to within 20 cm of the blade 222 or the velocity of the finger 229 toward the blade 229 exceeds 20 cm/sec. Some power tool embodiments include the ultrasonic transducer 225 or 226 in a position that covers a comparatively small region around the moving implement. In these configurations, any detection of the human body part is considered to be within the predetermined distance, and the controller 240 operates the implement arrest mechanism in response to the detection of any human body parts in the region around the implement.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A power tool comprising:
   an implement;
   an actuator configured to move the implement in a predetermined motion during operation of the power tool;
   an implement arrest mechanism;
   at least one ultrasonic device; and
   a controller operatively connected to the actuator, the at least one ultrasonic device, a memory, and the implement arrest mechanism, the controller configured to execute program instructions stored in the memory to:
   operate the actuator to move the implement;
   control the at least one ultrasonic device to emit at least one ultrasonic signal;
   control the at least one ultrasonic device to receive at least one echo return signal from an object reflecting the at least one ultrasonic signal;
   identify a distance between the implement and the object based upon the emitted at least one ultrasonic signal and the received at least one echo return signal;
   compare at least one amplitude of the at least one echo return signal to at least one amplitude of the at least one ultrasonic signal; and
   control the implement arrest mechanism in response to the identified distance being less than a predetermined distance threshold and in response to the comparison.

2. The power tool of claim 1 wherein the implement is a saw blade.

3. The power tool of claim 2, wherein the implement arrest mechanism is configured to retract the saw blade below a level of a table in the power tool.

4. The power tool of claim 2, wherein the implement arrest mechanism is configured to stop motion of the saw blade.

5. The power tool of claim 1, the controller further configured to:
identify the distance between the implement and the object based upon a time delay between emission of the at least one ultrasonic signal and reception of the at least one echo return signal.

6. The power tool of claim 1, the controller further configured to:
identify an absorption coefficient by the comparison of the at least one amplitude of the emitted at least one ultrasonic signal to the at least one amplitude of the at least one echo return signal.

7. The power tool of claim 6, the controller further configured to:
control the implement arrest mechanism in response to the absorption coefficient being above a predetermined absorption coefficient threshold stored in the memory.

8. The power tool of claim 7, the controller further configured to:
identify the object as a work piece in response to the absorption coefficient being below the predetermined absorption coefficient threshold.

9. The power tool of claim 1, the controller further configured to:
continue operation of the actuator to enable the implement to remain in motion in response to the object being identified as a work piece.

10. The power tool of claim 1, wherein the at least one ultrasonic device comprises an ultrasonic transducer.

11. The power tool of claim 1, the controller further configured to:
identify a velocity of the object using the at least one echo return signal; and
control the implement arrest mechanism in response to the identified velocity exceeding a predetermined velocity threshold and in response to the comparison.

12. A power tool comprising:
an implement;
an actuator configured to move the implement in a predetermined motion during operation of the power tool;
an implement arrest mechanism;
at least one ultrasonic device; and
a controller operatively connected to the actuator, the at least one ultrasonic device, a memory, and the implement arrest mechanism, the controller configured to execute program instructions stored in the memory to:
operate the actuator to move the implement;
control the at least one ultrasonic device to emit at least one ultrasonic signal;
control the at least one ultrasonic device to receive at least one echo return signal from an object reflecting the at least one ultrasonic signal;
compare at least one amplitude of the at least one echo return signal to at least one amplitude of the at least one ultrasonic signal; and
control the implement arrest mechanism in response to the comparison.

* * * * *